Nov. 28, 1950 H. M. REEVES Re. 23,299
PRIMARY AIR AND GAS SUPPLY MEANS FOR BURNERS
Original Filed May 3, 1946
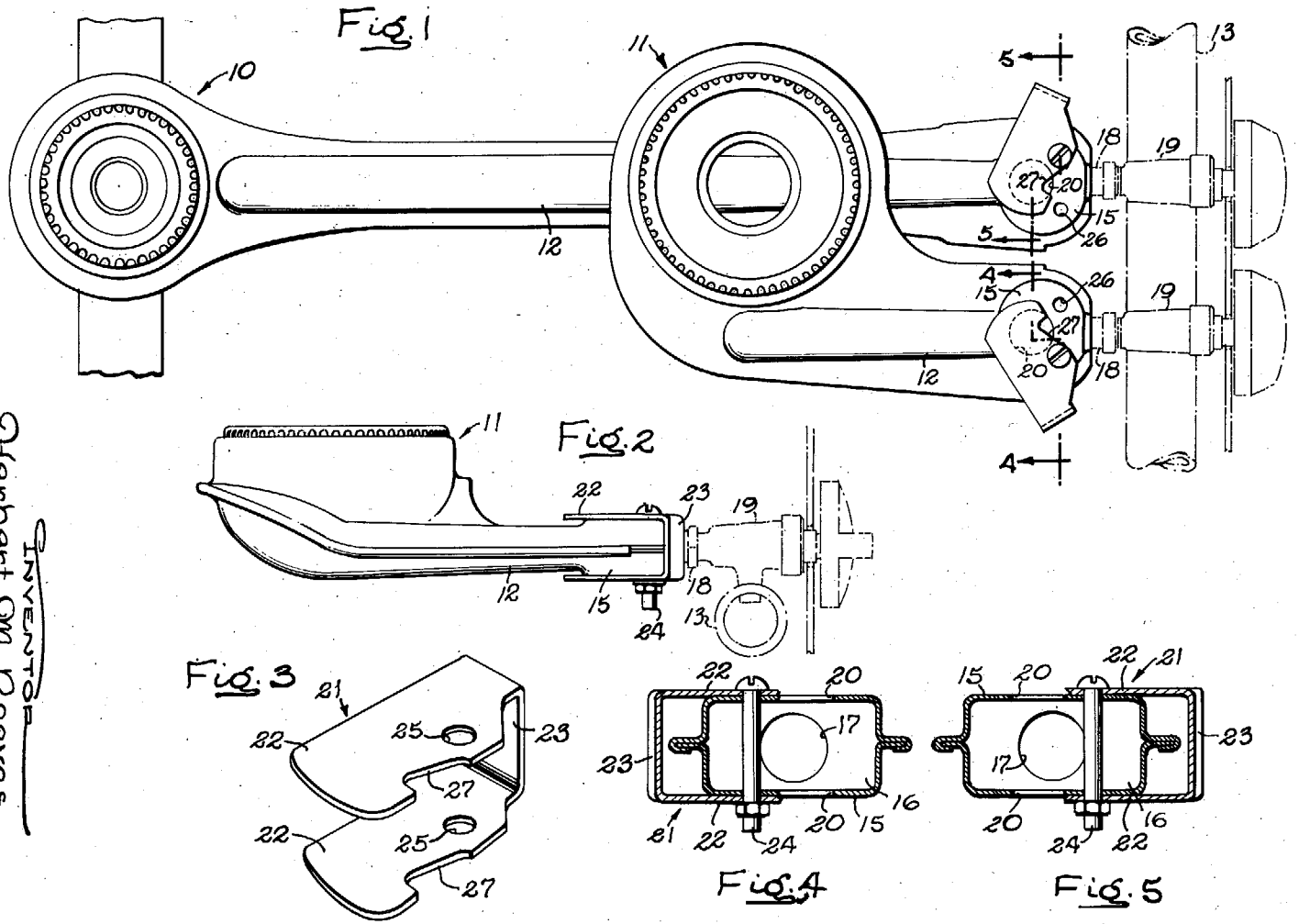
INVENTOR
Herbert M. Reeves
By Carlson, Pitzner, Hubbard & Wolfe
ATTORNEYS Reissued Nov. 28, 1950

Re. 23,299

UNITED STATES PATENT OFFICE 23,299

PRIMARY AIR AND GAS SUPPLY MEANS FOR BURNERS

Herbert M. Reeves, Kankakee, Ill., assignor to Florence Stove Company, Gardner, Mass., a corporation of Massachusetts Original No. 2,474,957, dated July 5, 1949, Serial No. 667,212, May 3, 1946. Application for reissue August 26, 1949, Serial No. 112,575

3 Claims. (Cl. 126—118)

Matter enclosed in heavy brackets [ ] appears in the original patent but forms no part of this reissue specification; matter printed in italics indicates the additions made by reissue

The invention relates to burners for gas cookstoves and more particularly to the control of the primary air and gas supply for such burners.

One object of the invention is to provide primary air and gas supply means for burners of the above general character which furnishes a more uniform and better distributed supply of primary air and gas to the mixing portion of the burner and which is readily adjustable to admit precisely the required amount of air.

A more specific object is to provide an improved air and gas inlet chamber and shutter construction for gas burners in which air is admitted to the chamber on opposite sides of the entering stream of gas under control of a unitary shutter.

Another object is to provide an adjustable air control shutter universally adaptable for either front or rear burners and for either right or left hand mounting.

A further object is to provide an adjustable air control shutter for gas burners adapted in all adjusted positions to maintain an air inlet opening of substantial width as compared to its length, which opening is much less subject to clogging by accumulation of dust than the long narrow slit type of opening heretofore employed.

Other objects and advantages of the invention will become apparent from the following detailed description of the preferred embodiment illustrated in the accompanying drawing in which:

Figure 1 is a plan view of a front and rear top burner assembly for gas stoves equipped with air and gas supply means embodying the features of the invention.

Fig. 2 is a side elevational view of the front burner shown in Fig. 1.

Fig. 3 is a perspective view of the improved air shutter.

Figs. 4 and 5 are respectiively transverse sectional views of the air and gas inlet chambers of the burners taken in vertical planes substantially on the lines 4—4 and 5—5 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the improved primary air and gas supply means has been shown as incorporated in a sheet metal top burner assembly of the type disclosed in my copending application Serial No. 667,211, filed May 3, 1946. The particular burner assembly shown includes a rear burner 10 and a front burner 11 each having a tubular portion 12 defining a mixing passage and extending forwardly to receive gas from a common manifold 13 extending along the front of the cooking top of the stove.

In order to introduce the required amount of primary air into the burner with the gas supplied from the manifold 13, the mixing tube 12 is terminated at its forward end in an enlargement 15 forming a gas and air inlet chamber 16. The chamber 16 communicates with the mixing passage of tube 12 by way of a restricted throat 17 at one side of the chamber and an opening is provided at the opposite or front side of the chamber for the reception of a gas discharge nozzle 18. The nozzle 18, as herein shown, is mounted on a valve 19 controlling the flow of gas from the manifold 13.

In accordance with the invention, the enlargement 15 is shaped to provide relatively wide flat top and bottom walls for the chamber 16 and each wall is formed with an inlet opening 20 for primary air. The inlet openings are preferably located closely adjacent the throat 17 in transverse alinement therewith so that air is drawn into the mixing tube in a smooth even flow by the aspirating effect produced by the discharge of gas from the nozzle 18 into the throat 17, substantially equal amounts of air entering through each opening and merging with the stream of gas on opposite sides thereof to insure thorough mixing therewith in the mixing passage of the burner.

To regulate the amount of primary air admitted to the chamber 16, I provide a unitary shutter 21 operative to control the effective area of both air inlet openings simultaneously and to maintain such areas substantially equal in all open positions of the shutter. In the preferred form shown in Fig. 3 of the drawing, the shutter 21 is of generally U-shaped form comprising a pair of flat, plate-like shutter elements interconnected at one end by an integral cross member 23. The shutter elements 22 are disposed in parallel relation with their leading edges alined and are spaced apart to enable them when mounted in straddling relation to the mixing tube enlargement 15 to lie snugly against the top and bottom walls of the chamber 16 as shown in Figs. 4 and 5. A pivot pin, herein shown as a stove bolt 24, inserted through alined holes 25 in the shutter elements 22 and similarly alined holes 26 in the top and bottom walls of the chamber 16 holds the parts in assembled relation and permits the shutter elements to be swung into or out of register with the air inlet openings 20.

Preferably two sets of holes 26 are provided, one at each side of the opening 20 so that the shutter may be mounted at either the right or left hand side of the opening as shown in Fig. 1. The shutter elements 22 are dimensioned so as to overlie the holes when in fully closed position. In the normal operation of the burner a portion of the primary air is admitted through the unused bolt holes 26, but the main portion, of course, is admitted through the openings 20.

It will be evident that the effective areas of the main air inlet openings 20 may be varied as required between maximum and minimum opening by suitably adjusting the position of the shutter 21. Clogging of the opening by accumulation of dust which is particularly troublesome in conventional shutter arrangements when set for a relatively small opening is minimized in the present instance by forming the leading edge of each shutter element 22 with an arcuate notch 27. With the shutter in the partially closed position as shown in Fig. 1 for the front burner 11, the notches 27 together with the chamber walls adjacent the openings 20 define air inlets of substantial width as compared with their length. Such ratio of width to length is maintained as the shutter is moved toward the closed position, thus providing in all adjusted positions of the shutter an opening less subject to clogging than the conventional slit type of opening. It will be noted also that the auxiliary inlet openings provided by the bolt holes 26 are circular in form and thus likewise substantially free of any tendency to become clogged.

It will be apparent from the foregoing that the invention provides air and gas supply means for gas burners which furnishes a uniform and evenly distributed supply of primary air to the mixing tube of the burner and which is readily adjustable to regulate the amount of air admitted. Thorough mixing of the air and gas and a smooth even flow is insured by introducing the air into the mixing chamber at opposite sides of the entering stream of gas. The improved air and gas supply means also includes a unitary adjustable shutter structure of novel and advantageous form adapted to control the admission of air through both openings simultaneously and to provide air inlets of substantial width as compared to their length, thus substantially reducing or eliminating tendency to clog from an accumulation of dust.

I claim as my invention:

[1. The combination with a gas burner having a burner head with a mixing passage leading thereto, of means forming a gas and air inlet chamber communicating at one side with the passage and having an opening in the opposite side for the reception of a gas discharge nozzle, said chamber having flat parallel top and bottom walls provided with alined air inlet openings for admitting air at opposite sides of the stream of gas issuing from said nozzle, a unitary shutter for controlling the admission of air through said air inlet openings comprising a pair of plate-like shutter elements disposed in parallel relation and rigidly connected together at one end by an integral cross member, said shutter elements being spaced apart to permit them to fit snugly over the top and bottom walls of said chamber, and means providing a pivot about which said shutter may be swung to move said elements across said air inlet openings, said elements having their leading edges alined so as to maintain the effective areas of both inlet openings substantially equal in all open positions of the shutter.]

2. The combination was a gas burner having a burner head with a mixing passage leading thereto, of means forming a gas and air inlet chamber communicating at one side with the passage and having an opening in the opposite side for the reception of a gas discharge nozzle, said chamber having flat parallel top and bottom walls provided with alined air inlet openings for admitting air at opposite sides of the stream of gas issuing from said nozzle, a generally U-shaped shutter adapted to be mounted in straddling relation to said chamber, said shutter including a pair of flat plate-like shutter elements disposed in parallel spaced relation and rigidly connected together at one end by an integral cross member, and means supporting said shutter for pivotal movement whereby said shutter elements may be adjusted to regulate the effective areas of said air inlet openings, the leading edges of said elements being notched for cooperation with the chamber walls around said air inlet openings to define air inlets of substantial width as compared with their length in all adjusted positions of said shutter.

3. The combination with a gas burner having a burner head with a mixing passage leading thereto, of means forming a gas and air inlet chamber communicating at one side with the passage and having an opening in the opposite side for the reception of a gas discharge nozzle, said chamber having flat parallel top and bottom walls provided with alined air inlet openings for admitting air at opposite sides of the stream of gas issuing from said nozzle, a unitary shutter for controlling the admission of air through said air inlet openings comprising a pair of plate-like shutter elements disposed in parallel relation and rigidly connected together at one end by an integral cross member, said shutter elements being spaced apart to permit them to fit snugly over the top and bottom walls of said chamber, said elements having alined holes adjacent said cross member for the reception of a pivot pin, said top and bottom chamber walls having two pairs of alined holes located respectively at opposite sides of said air inlet openings for the accommodation of said pivot pin alternatively whereby said shutter may be mounted on either side of said chamber.

*4. The combination with a gas burner having a burner head with a mixing passage leading thereto, of means forming a gas and air inlet chamber communicating with said passage and having an opening axially alined with the passage for the reception of a gas discharge nozzle, said chamber having flat parallel top and bottom walls with transversely alined air inlet openings of uniform size and shape for admitting air at opposite sides of a stream of gas issuing from said nozzle, a generally U-shaped unitary shutter for controlling the admission of air through said air inlet openings comprising a pair of flat plate-like shutter elements disposed in parallel relation and connected together at one end by an integral cross member, means for adjustably supporting and guiding the shutter on said chamber including clamping means extending through the chamber and through both of said shutter elements, said clamping means serving to hold*

*the shutter elements firmly against the flat top and bottom walls respectively of the chamber and being releasable to permit movement of the shutter elements in unison relative to their respective air inlet openings to vary the effective areas thereof.*

HERBERT M. REEVES.

REFERENCES CITED

The following references are of record in the file of this patent:

UNITED STATES PATENTS

| Number | Name | Date |
|---|---|---|
| 492,041 | Mitchell | Feb. 21, 1893 |
| 541,212 | Pettibone | June 18, 1895 |
| 1,281,138 | Coleman | Oct. 8, 1918 |
| 1,471,381 | Caldwell | Oct. 23, 1923 |
| 1,753,141 | Wyatt | Apr. 1, 1930 |
| 1,791,360 | Kerr | Feb. 3, 1931 |
| 2,300,961 | Pratt | Nov. 3, 1942 |
| 2,379,854 | Harper | July 10, 1945 |
| 2,470,713 | Mueller | May 17, 1949 |